United States Patent
Roh et al.

(10) Patent No.: US 10,599,574 B2
(45) Date of Patent: Mar. 24, 2020

(54) MEMORY CONTROL DEVICE AND OPERATING METHOD THEREOF

(71) Applicants: SK TELECOM CO., LTD., Seoul (KR); INDUSTRY-ACADEMIC COOPERATION FOUNDATION, YONSEI UNIVERSITY, Seoul (KR)

(72) Inventors: Hong Chan Roh, Seoul (KR); Sang Hyun Park, Seoul (KR); Jong Chan Lee, Seoul (KR); Hong Kyu Park, Seoul (KR); Jae Hyung Kim, Incheon (KR)

(73) Assignee: SK TELECOM CO., LTD., Seoul (KR)

(*) Notice: Subject to any disclaimer, the term of this patent is extended or adjusted under 35 U.S.C. 154(b) by 0 days.

(21) Appl. No.: 16/062,860

(22) PCT Filed: Apr. 1, 2016

(86) PCT No.: PCT/KR2016/003400
§ 371 (c)(1),
(2) Date: Jun. 15, 2018

(87) PCT Pub. No.: WO2017/104906
PCT Pub. Date: Jun. 22, 2017

(65) Prior Publication Data
US 2018/0373636 A1    Dec. 27, 2018

(30) Foreign Application Priority Data
Dec. 17, 2015    (KR) .................. 10-2015-0180958

(51) Int. Cl.
*G06F 12/0866* (2016.01)
*G06F 12/02* (2006.01)

(52) U.S. Cl.
CPC ...... *G06F 12/0866* (2013.01); *G06F 12/0246* (2013.01); *G06F 2212/1024* (2013.01); *G06F 2212/222* (2013.01)

(58) Field of Classification Search
CPC ............. G06F 12/0866–0873; G06F 12/0888
See application file for complete search history.

(56) References Cited

U.S. PATENT DOCUMENTS

| 9,235,516 B1 * | 1/2016 | Marshak | ............. G06F 12/0802 |
| 2006/0015685 A1 * | 1/2006 | Daito | ................. G06F 12/0842 711/118 |

(Continued)

FOREIGN PATENT DOCUMENTS

| KR | 10-2013-0118318 A | 10/2013 |
| KR | 10-1531026 B1 | 5/2015 |

(Continued)

OTHER PUBLICATIONS

Gu Zheng. "linux / drivers / and / bcache / request.c." Nov. 2014. https://github.com/torvalds/linux/blob/aae4933da9488827d341c31b970b2f62ac45a496/drivers/md/bcache/request.c. (Year: 2014).*

(Continued)

*Primary Examiner* — Nathan Sadler
(74) *Attorney, Agent, or Firm* — Hauptman Ham, LLP

(57) ABSTRACT

The present disclosure relates to a memory control device which can distribute and transfer a read request for cache hit data so as to allow a hard disk as well as a cache memory to process the read request, thereby maximizing the throughput of the entire storage device, and an operation method of the memory control device.

16 Claims, 4 Drawing Sheets

(56) References Cited

U.S. PATENT DOCUMENTS

| | | |
|---|---|---|
| 2012/0210058 A1 | 8/2012 | Mittendorff et al. |
| 2013/0036260 A1* | 2/2013 | Kurashige ........... G06F 12/0868 |
| | | 711/103 |
| 2015/0212946 A1* | 7/2015 | Goshima ............. G06F 12/0868 |
| | | 711/123 |

FOREIGN PATENT DOCUMENTS

| | | |
|---|---|---|
| KR | 10-2015-0106132 A | 9/2015 |
| WO | 2010-093108 A1 | 8/2010 |

OTHER PUBLICATIONS

International Search Report for application No. PCT/KR2016/003400 dated Oct. 17, 2016.

\* cited by examiner

MEMORY CONTROL DEVICE AND OPERATING METHOD THEREOF

CROSS REFERENCE TO RELATED APPLICATION

This present application is a national stage filing under 35 U.S.C § 371 of PCT application number PCT/KR2016/003400 filed on Apr. 1, 2016 which is based upon and claims the benefit of priority to Korean Patent Application No. 10-2015-0180958 filed on Dec. 17, 2015 in the Korean Intellectual Property Office. The disclosures of the above-listed applications are hereby incorporated by reference herein in their entirety.

BACKGROUND OF THE INVENTION

1. Field of the Invention

The present disclosure relates to a memory control device which can distribute read request for cache hit data so as to allow a hard disk as well as a cache memory to process the read request for cache hit data, thereby maximizing the throughput of the entire storage device, and an operation method of the memory control device.

2. Description of the Prior Art

Solid State Disks (SSD) are excellent in performance in comparison with hard disks. However, SSDs are less efficient than hard disks in view of capacity and lifespan when the price is considered.

Because of said advantage/disadvantage of SSDs in comparison with hard disks, a memory system uses an SSD as a cache device of a hard disk, instead of using an SSD as a single storage device in order to construct a high efficiency system at a low cost.

In a memory system where an SSD is used as a cache device (hereinafter, an SSD-based cache memory), frequently used data is loaded in an SSD-based cache memory and relatively less frequently used data is loaded in a hard disk. As a result, the memory system can properly alleviate a slow performance problem when a hard disk is used as a single storage device. In addition, the memory system can properly alleviate a high cost and a limited lifespan problem when an SSD is used as a single storage device.

Therefore, in the memory system adopting the SSD-based cache memory, it may be advantageous to load frequently accessed (used) data in an SSD-based cache memory in view of performance of the system.

The memory system can work well in a case of reading small sized data due to the characteristic of a cache memory. However the memory system may be inefficient in a case of reading a large amount of data such as a big data platform.

Specifically, when data (cache hit data) is read from a cache memory, cache hit data is read only from the cache memory and, during the reading, a hard disk does not operate.

Therefore, when a large amount of cache hit data is read by a cache memory, a hard disk is continuously in a standby state for a considerably long time during which the large amount of cache hit data is read from the cache memory. Since the hard disk in a standby state cannot be utilized, it may be inefficient in view of the throughput of a storage device.

Accordingly, the present disclosure proposes a method which enables reading cache hit data from a hard disk as well as a cache memory thereby maximizing the throughput of the entire storage device.

SUMMARY OF THE INVENTION

An aspect to be achieved by the present disclosure is to provide a memory control device which can distribute/transfer a read request for cache hit data so as to allow a hard disk as well as a cache memory to process the read request, thereby maximizing the throughput of the entire storage device, and an operation method of the memory control device.

A memory control device according to an embodiment of the present disclosure includes: an activation control unit configured to activate a distribution function according to a state of a cache memory when a read request for cache hit data is identified; a distribution target identification unit configured to determine whether a process generating the read request corresponds to a target process to be distributed when the distribution function is activated; and a read request distribution unit configured to distribute the read request to a hard disk to allow the hard disk to process the read request instead of the cache memory when the process is identified to be the target process.

Specifically, the activation control unit may be configured to monitor an average processing time interval for a request processed in the cache memory during a unit time interval; and activate the distribution function when the average processing time interval is equal to or greater than a predefined threshold time interval.

Specifically, the threshold time interval may be equal to or longer than a minimum processing time interval measured when a bandwidth according to throughput for request processed during a unit time interval in the cache memory is close to a predetermined maximum bandwidth.

Specifically, the activation control unit may be configured to deactivate the distribution function after the distribution function is activated, when a bandwidth of the cache memory becomes smaller by a predetermined size or more than the maximum bandwidth or when a total bandwidth of the hard disk and the cache memory is smaller than a total bandwidth before the distribution function is activated.

Specifically, the activation control unit may be configured to differently define a threshold number of processes that can be configured to be the target process, according to a degree by which the average processing time interval exceeds the threshold time interval in the case of activating the distribution function.

Specifically, the distribution target identification unit may be configured to determine whether the process corresponds to the target process, on the basis of a distribution target list in which pieces of information of respective processes configured as the target process are included.

Specifically, the pieces of information of the respective processes included in the distribution target list may comprise a process identifier and a request time point of a last read request generated in the process, and the distribution target list may include pieces of information of a predefined threshold number of processes where information of a process including an oldest request time point is located on a tail, and may be updated reflecting an identification result of the distribution target identification unit.

Specifically, the distribution target identification unit may be configured to identify the process as the target process when information of the process is included in the distribution target list, and the distribution target list may be updated such that: the information of the process included in the distribution target list is removed; pieces of information of processes located from a head of the distribution target list to a prior location to the removed information of the process is moved; and then information of the process including a request time point of the read request is located on the head.

Specifically, the distribution target identification unit may be configured to identify the process as the target process when information of the process is not included in the distribution target list and the number of processes configured as the target process is smaller than the threshold number, and the distribution target list may be updated such that: pieces of information of respective processes located from a head of the distribution target list is moved; and then information of the process including a request time point of the read request is located on the head.

Specifically, the distribution target identification unit may be configured to: determine whether information of a process located on the tail of the distribution target list can be removed, when information of the process is not included in the distribution target list and the number of process configured as the target process is not smaller than the threshold number; and identify the process as the target process when the information of the tail is removed.

Specifically, the distribution target list may be updated such that: the information of the process located on the tail of the distribution target list is removed when a predefined list maintenance time interval passes from a request time point included in the information of the process located on the tail; pieces of information of respective processes located from the head of the distribution target list is moved; and then information of the process including a request time point of the read request is located on the head.

An operation method of a memory control device according to an embodiment of the present disclosure includes: performing an activation control by activating a distribution function according to a state of a cache memory when a read request for cache hit data is identified; performing a distribution target identification by determining whether a process generating the read request corresponds to a target process to be distributed when the distribution function is activated; and performing a read request distribution by distributing the read request to a hard disk to allow the hard disk to process the read request instead of the cache memory when the process is identified to be the target process.

Specifically, the performing the distribution target identification may comprise: determining whether the process corresponds to the target process, on the basis of a distribution target list in which pieces of information of respective processes configured as the target process are included.

Specifically, the pieces of information of the processes listed in the distribution target list may comprise: a process identifier and a request time point of a last read request generated in the process, and the distribution target list may include pieces of information of a predefined threshold number of pieces of information of processes where information of a process including an oldest request time point is located on a tail, and is updated reflecting an identification result.

Specifically, the performing the distribution target identification may comprises: identifying the process to be the target process when information of the process is included in the distribution target list.

Specifically, the performing the distribution target identification may comprises: identifying the process to be the target process in a case where information of the process is not included in the distribution target list when the number of processes configured as the target process is smaller than the threshold number; and identifying the process to the target process in a case where information of the process is not included in the distribution target list and the number of processes configured as the target process is not smaller than the threshold number when determining whether information of a process located on the tail of the distribution target list can be removed and removing the information of the tail.

The present disclosure allows distribution/transfer of a read request for cache hit data to enable a hard disk as well as a cache memory to process the read request, thereby achieving an effect of maximizing the throughput of the entire storage device.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described with reference to the accompanying drawings.

Firstly, a configuration of a memory system including a memory control device according to an embodiment of the present disclosure will be described with reference to FIG. 1.

Figure 1:
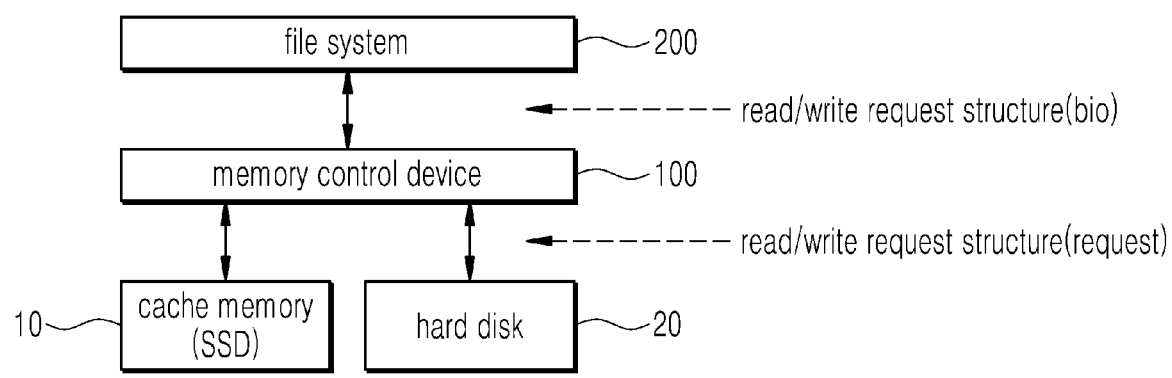
FIG. 1 is a configuration diagram briefly showing a configuration of a memory system including a memory control device according to an embodiment of the present disclosure.

As illustrated in FIG. 1, a memory system includes a hard disk 20 and a cache memory 10, as storage devices. Also, the memory system includes a file system 200 configured to attempt to perform a memory operation for the storage device and a memory control device 100 configured to control the storage device between the file system 200 and the storage device.

The memory control device 100 according to the present disclosure may be a control device dedicated for the cache memory 10 that can interwork with a control device (not illustrated) dedicated for the hard disk 20 for controlling the hard disk 20, or may be a control device that controls both the cache memory 10 and the hard disk 20.

The memory control device 100 according to the present disclosure may operate in a block layer level of an operating system. The operating in the block layer level of the operating system implies that a structure of input/output of a process controlled by the memory control device 100 follows a data structure used in a block layer. The structure of input/output may include a size (a sector unit) of input/output, a logical sector address of input/output, and a type (read/write) of input/output.

As illustrated in FIG. 1, the structure of input/output in the block layer level, which is a read/write request structure generated in the file system 200, specifically, in a process within the file system 200 follows a data structure referred to as a "bio".

Therefore, the memory control device 100 according to the present disclosure, located in the block layer of the operating system may control a read request (a bio structure) generated in the file system 200, specifically, in a process within the file system 200.

In the memory system of FIG. 1 including the memory control device 100 of the present disclosure, the cache memory 10 used as a cache device may be a NAND flash memory.

For example, the cache memory 10 may be a Solid State Drive (SSD), which is a type of a NAND flash memory. For convenience of explanation, the cache memory 10 and the SSD 10 are used together in the following description.

A memory system with the SSD 10 does not use the SSD 10 as a single storage device but uses the SSD 10 as a cache device of a hard disk in order to construct a high efficiency system at a low cost.

In the memory system using the SSD 10 with relatively small capacity as the cache device, frequently used data is loaded in the SSD 10 and relatively less frequently used data is loaded in the hard disk 20 in order to construct a high efficiency system at a low cost. As a result, the memory system properly alleviates a slow performance problem when the hard disk 20 is used as a single storage device. In addition, the memory system properly alleviates a high cost and a limited lifespan problem when the SSD 10 is used as a single storage device.

Therefore, in the memory system, it may be advantageous to load frequently accessed (used) data in the SSD 10 in view of performance of the system.

Meanwhile, due to the characteristic of a cache memory, the memory system works well in a case of reading small sized data. However the memory system may be inefficient in a case where it is necessary to read a large amount of data such as a big data platform.

Specifically, when data (cache hit data) is read from the SSD 10, that is, from the cache memory 10, cache hit data is read from only the cache memory 10 and, during the reading, the hard disk 20 does not operate.

Therefore, when a large amount of cache hit data is read from the cache memory 10, the hard disk 20 is continuously in a standby state for a considerably long time during which the large amount of cache hit data is read from the cache memory 10. Since the hard disk 20 in a standby state cannot be utilized, it may be inefficient in view of the throughput of the storage device.

Accordingly, the present disclosure proposes a method which enables reading cache hit data from the hard disk 20 as well as the cache memory 10 thereby maximizing the throughput of the entire storage device.

Figure 2:
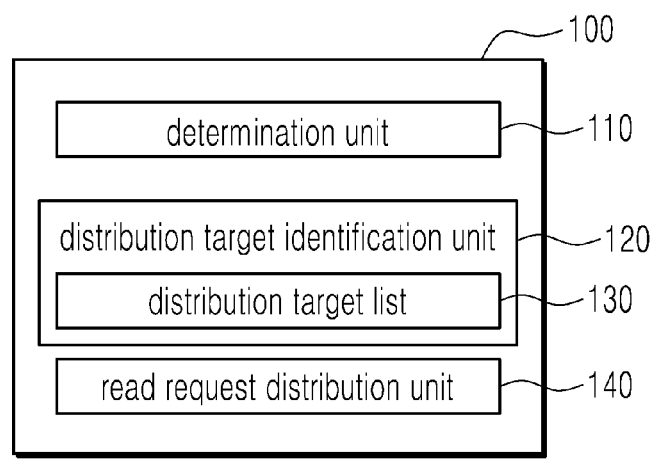
FIG. 2 is a block diagram specifically showing a memory control device according to an embodiment of the present disclosure.

Hereinafter, a memory control device according to an embodiment of the present disclosure will be described in detail with reference to FIG. 2.

The memory control device 100 according to an embodiment of the present disclosure includes: an activation control unit 110 configured to activate a distribution function according to a state of the cache memory 10 when a read request for cache hit data existing in a hard disk 20 and a cache memory 10 is identified; a distribution target identification unit 120 configured to determine whether a process having generated the read request corresponds to a target process to be distributed when the distribution function is activated; and a read request distribution unit 140 configured to distribute the read request to a hard disk 20 to allow the hard disk 20 instead of the cache memory 10 to process the read request when the process is identified to be the target process.

The cache memory 10 may be a Solid State Drive (SSD) which is a type of a NAND flash memory, as mentioned in the description referring to FIG. 1. For convenience of explanation, the cache memory 10 and the SSD 10 are used together in the following description.

The activation control unit 110 is configured to activate a distribution function according to a state of the cache memory 10 when a read request for cache hit data existing in the hard disk 20 and the cache memory 10 is identified.

More specifically, when a read request generated in the file system 200, specifically, in a process within the file system 200 is received by (distributed to) the memory control device 100 of the present disclosure located in the block layer of the operating system, the activation control unit 110 is configured to firstly determine whether the current read request is a read request for cache hit data.

A method of determining whether the read request is a read request for cache hit data is in line with an existing identification method, and a specific explanation about the method will be omitted.

When the activation control unit 110 identifies that the current read request is not a read request for cache hit data, the memory control device 100 of the present disclosure may distribute the current read request to the hard disk 20 to allow the hard disk 20 to process the request.

Meanwhile, when the current read request is identified to be a read request for cache hit data, the activation control unit 110 is configured to activate a distribution function according to a state of the cache memory 10.

According to a Write-through policy, it can be guaranteed that the cache hit data exists in both the hard disk and the cache memory. However, according to a Write-back policy or a Write-around policy, it is not guaranteed that the data exists in both the hard disk and the cache memory.

Therefore, when a read request for cache hit data is identified, the activation control unit 110 may be configured to determine whether the cache hit data currently requested to be read exists in the hard disk with reference to an index. When the cache hit data does not exist in the hard disk, the current read request is distributed only to the cache memory 10.

Meanwhile, when a read request for cache hit data is identified and the cache hit data is determined to exist in the hard disk with reference to an index, the activation control unit 110 may be configured to activate a distribution function according to a state of the cache memory 10.

The cache hit data in the following description means data which is guaranteed or identified to exist in both the cache memory 10 and the hard disk 20.

In the present disclosure, when a read request for cache hit data is identified and the cache memory 10 is in a congestion state, a distribution function is automatically activated.

More specifically, the activation control unit 110 may be configured to monitor an average processing time interval for a request processed in the cache memory 10 during a unit time interval, and activate the distribution function when the average processing time interval is equal to or greater than a predefined threshold time interval.

The activation control unit 110 is configured to monitor an average processing time interval of a request (e.g. read/write request) processed in the cache memory 10 during a unit time interval (e.g. one second).

That is, the activation control unit 110 is configured to monitor an average time interval obtained by averaging processing time intervals (await time) for requests (e.g. read/write requests), which are processed during a unit time interval (e.g. one second) in the cache memory 10.

The processing time interval (await time) means a time difference between a time point at which a request (e.g. read/write request) is distributed to the cache memory 10 and a time point at which processing of the corresponding request (e.g. read/write request) is finally completed in the cache memory 10.

The activation control unit 110 may be configured to activate a distribution function when an average processing time interval monitored in a unit time interval (e.g. one second) is equal to or greater than a threshold time interval (await threshold value).

The threshold time interval (await threshold value) may be defined as a time equal to or longer than a minimum processing time interval (minimum await value) measured when a bandwidth according to a throughput for request processed during a unit time interval (e.g. one second) in the cache memory 10 is close to a predetermined maximum bandwidth.

To this end, in the present disclosure, a minimum processing time interval (minimum await value) when a bandwidth according to a throughput of a request (e.g. read/write request) processed during a most recent unit time interval (e.g. one second) in the cache memory 10 is close to a maximum bandwidth (e.g. the maximum bandwidth±5%) is founded. Then, the minimum processing time interval (minimum await value) may defined as a threshold time interval (await threshold value). Alternatively, an await value which is greater by a predetermined size or more than the minimum processing time interval (minimum await value) may defined as a threshold time interval (await threshold value).

In the present disclosure, using the same method as described above, a threshold time interval (await threshold value) may be defined in for the unit time interval (e.g. one second) in the cache memory 10. Then, the threshold time interval (await threshold value) defined for the unit time interval (e.g. one second) may be gradually maintained (defined) as a constant threshold time interval (await threshold value) after a predetermined time.

When an average processing time interval monitored in a unit time interval (e.g. one second) is equal to or greater than a threshold time interval (await threshold value) defined by the same method as described above, the activation control unit 110 is configured to determine that a state (throughput) of the cache memory 10 is in a congestion state where a bandwidth of the cache memory 10 is close to a maximum bandwidth and then activate a distribution function.

When activating a distribution function, the activation control unit 110 may differently define a threshold number of processes which can be configured as the target process, according to a degree by which an average processing time interval of requests (e.g. read/write requests) processed in the cache memory 10 during a unit time interval (e.g. one second) exceeds a threshold time interval (await threshold value).

For example, the activation control unit 110 may differently define a threshold number according to a policy preconfigured such that a threshold number is defined to be a bigger number, as a degree by which an average processing time interval exceeds the threshold time interval (await time) is large, and a threshold number is defined to be a smaller number, as the degree is small.

Meanwhile, the activation control unit 110 may be configured to deactivate the distribution function, when a bandwidth according to a throughput of a request (e.g. read/write request) processed during a most recent unit time interval (e.g. one second) in the cache memory 10 becomes smaller by a predetermined size or more than the aforementioned maximum bandwidth.

This is because the congestion state of the cache memory 10 can be considered to have been released when the bandwidth of the cache memory 10 becomes smaller by a predetermined size or more than a maximum bandwidth.

Alternatively, the activation control unit 110 may be configured to deactivate the distribution function, when a total bandwidth of the hard disk 20 and the cache memory 10 is smaller than a total bandwidth before the distribution function is activated.

This is because the throughput of the entire storage device is considered to be rather reduced due to activation of the distribution function, when a total bandwidth obtained by adding a bandwidth according to a throughput in the hard disk 20 and a bandwidth according to a throughput in the cache memory 10 for a request (e.g. read/write request) processed during a most recent unit time interval (e.g. one second) becomes smaller than a total bandwidth immediately before the distribution function is activated.

The activation control unit 110 may be configured to gradually increase a predefined threshold time interval (await threshold value) when the distribution function is activated and a total bandwidth of the hard disk 20 and the cache memory 10 is smaller than a total bandwidth immediately before the distribution function is activated. In this case, condition for activating the distribution function may be more restricted, so that the activated distribution function can be deactivated.

The distribution target identification unit 120 is configured to determine whether a process having generated the current read request corresponds to the target process to be distributed when the distribution function is activated.

More specifically, the distribution target identification unit 120 may be configured to determine whether a process having generated the current read request corresponds to the target process, on the basis of a distribution target list in which pieces of information of respective processes configured as the target process are listed.

That is, the memory control device 100 of the present disclosure may be configured to manage a distribution target list 130 having a structure in which pieces of information of respective processes configured as the target process are listed.

Then, the distribution target identification unit 120 may be configured to determine whether a process having generated the current read request corresponds to the target process, on the basis of the distribution target list 130.

Hereinafter, the distribution target list 130 will be described in detail.

The distribution target list 130 has a structure in which pieces of information of respective processes configured as the target process are listed.

The information of a process listed in the distribution target list 130 may include a process identifier and a request time point of a last read request generated in the process.

The distribution target list 130 may have a list structure in which information of a process including a most recent request time point is located on a head and information of a process including an oldest request time point is located on a tail in a state where a predefined threshold number of pieces of information of processes are listed.

The distribution target list 130 may be configured to be updated reflecting an identification result of the distribution target identification unit 120.

Hereinafter, a more detailed description will be given with reference to FIG. 3. The distribution target list 130 may have a structure in which N number of pieces of process information can be listed. N may be a threshold number defined by the activation control unit 110 as described above.

That is, the distribution target list 130 may list a total N number of pieces of process information, from the head to the tail.

As described above, the information of a process listed in the distribution target list 130 may include a process identifier (PID: Process ID) and a request time point of a last read request generated in the process.

Figure 3:
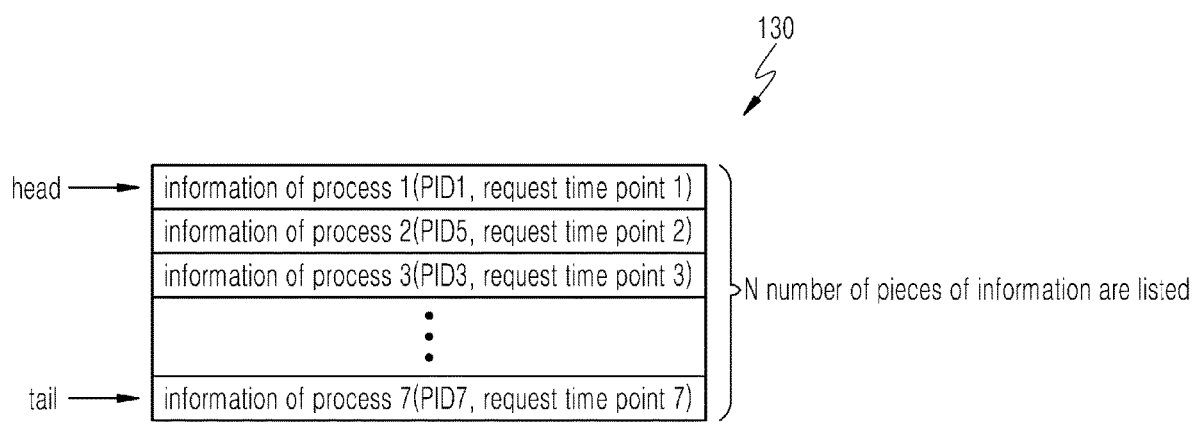
FIG. 3 is an example showing a distribution target list according to an embodiment of the present disclosure.

Referring to FIG. 3, in a case of the information of a process located on a head of the distribution target list 130, the information of process 1 located on the head includes a process identifier (PID1) for identifying process 1 and a request time point of a last read request generated in the process 1.

The distribution target list 130 has a list structure in which information of a process including a most recent request time point is located on a head and information of a process including an oldest request time point is located on a tail in a state where information of N number of process information are listed.

Therefore, in a case of a distribution target list 130 in which N number of pieces of process information are listed as illustrated in FIG. 3, it is noted that information of process 1 having most recently generated a last read request among the pieces of information of processes listed in the distribution target list 130 is located on ahead of the distribution target list 130, and information of process 7 having most previously generated a last read request among the pieces of information of processes listed in the distribution target list 130 is located on a tail of the distribution target list 130.

For convenience of explanation, it is assumed that the distribution target list 130 managed (updated) by the memory control device 100 is as FIG. 3.

Hereinafter, a procedure of determining whether a process having generated the current read request corresponds to the target process will be described in detail.

As described above, the distribution target identification unit 120 is configured to determine whether information of a process having generated the current read request exists in a distribution target list 130 when a read request for cache hit data is identified and a state of the cache memory 10 is a congestion state.

When information of a process having generated the current read request exists in the distribution target list 130, the distribution target identification unit 120 may identify that the process corresponds to the target process.

For example, on an assumption that a process having generated the current read request is process 3, the distribution target identification unit 120 may identify that information of process 3 having generated the current read request exists in the distribution target list 130 and identify the process 3 to be the target process.

Then, the distribution target list 130 may be updated reflecting an identification result of the distribution target identification unit 120, that is, a result obtained by identifying that the process 3 existing in the distribution target list 130 corresponds to the target process.

More specifically, the distribution target list 130 may be updated such that: the information of process 3 having existed in the distribution target list 130 is removed; pieces of information of respective processes located from a head of the distribution target list 130 to immediately before the removed information of process 3, that is, pieces of information of processes 1 and 5 move (move to the next one by one); and then information of process 3 including a request time point of the current read request is located on the head.

Meanwhile, the distribution target identification unit 120 may be configured to, when information of the process having generated the current read request does not exist in the distribution target list 130 and the number of processes configured as the target process is smaller than a threshold number, identify the process to be the target process.

For example, on an assumption that a process having generated the current read request is process 11, the distribution target identification unit 120 may identify that information of process 11 having generated the current read request does not exist in the distribution target list 130 and determine whether the number of processes configured as the target process up to the current time point is smaller than the threshold number.

Then, the distribution target identification unit 120 may be configured to identify process 11 to be the target process when the number of processes configured as the target process up to the current time point is smaller than the threshold number.

When the number of processes configured as the target process up to the current time point is smaller than the threshold number (N), the number of pieces of information of processes listed in the distribution target list 130 is smaller than N. Therefore, at least a tail part in the distribution target list 130 may be empty.

Then, the distribution target list 130 may be updated reflecting an identification result of the distribution target identification unit 120, that is, a result obtained by identifying that process 11 not existing in the distribution target list 130 corresponds to the target process.

More specifically, the distribution target list 130 may be updated such that: pieces of information of respective processes located from a head of the distribution target list 130, that is, pieces of information of processes 1, 5 and 3 move (move to the next one by one); and then information of process 11 including a request time point of the current read request is located on the head.

Meanwhile, the distribution target identification unit 120 is configured to determine whether information of a process located on the tail of the distribution target list 130 can be removed, when information of the process having generated the current read request does not exist in the distribution target list 130 and the number of processes configured as the target process is not smaller than the threshold number (N).

Then, the distribution target identification unit 120 may be configured to identify process 11 to be the target process when the information of a process located on the tail of the distribution target list 130 is removed.

When the number of processes configured as the target process up to the current time point is not smaller than the threshold number (N), the distribution target list 130 may be in a Full state where the listed processes are N number of pieces of information and the list is fully filled up to the tail thereof.

It is determined whether information of a process located on the tail can be removed in the distribution target list 130. In this case, when a predefined list maintenance time interval has passed from a request time point 7 included in the information of process 7 located on the tail of the distribution target list 130, the information of process 7 located on the tail may be determined to be able to be removed.

Therefore, information of a process having generated a read request before the list maintenance time interval can be removed in the distribution target list 130, and another new process can be configured to be the target process.

When the list maintenance time interval has passed from the request time point 7 included in information of process 7, the information of process 7 may be removed from the in tail of the distribution target list 130.

Then, when the information of the process located on the tail of the distribution target list 130 is removed, the distribution target identification unit 120 may identify process 11 to be the target process.

Then, the distribution target list 130 may be updated reflecting an identification result of the distribution target identification unit 120 where process 11 is identified not to exist in the distribution target list 130 and determined to correspond to the target process.

More specifically, the distribution target list 130 may be updated such that: pieces of information of respective processes located from a head of the distribution target list 130, that is, pieces of information of processes 1, 5 and 3 move (move to the next one by one); and then information of process 11 including a request time point of the current read request is located on the head.

As described above, the distribution target list 130 is managed to be updated reflecting an identification result of the distribution target identification unit 120. In this manner, the latest information on which process (up to maximum N number) is the target process and when the target process makes the last read request are managed by the distribution target list 130.

The read request distribution unit 140 is configured to distribute the current read request to the hard disk 20, when the distribution target identification unit 120 identifies that a process having generated the current read request for cache hit data corresponds to the target process.

That is, the read request distribution unit 140 is configured to distribute a read request generated by the target process to the hard disk 20, to allow the hard disk 20 instead of the cache memory 10 to process the read request.

The read request distribution unit 140 is configured to distribute the current read request to the cache memory 10, when the distribution target identification unit 120 identifies that a process having generated the current read request for cache hit data does not correspond to the target process.

That is, the read request distribution unit 140 is configured to distribute a read request generated by a process, which is not the target process, to the cache memory 10, so that the cache memory 10 can process the read request.

Unlike an existing method of distributing a read request for cache hit data to a cache memory 10, the present disclosure distributes the read request to a hard disk 20 as well as the cache memory 10 to process the read request, thereby maximizing the throughput of the entire storage device, as described above.

Further, according to the present disclosure, a distribution target list is utilized when a read request is distributed to the cache memory 10 and the hard disk 20, where the distribution target list consistently manages and updates the latest information on which process (up to maximum N number) is the target process and when the target process makes the last read request. Therefore, a read request can be efficiently distributed while system performance degradation resulting from the distribution is minimized.

Figure 4:
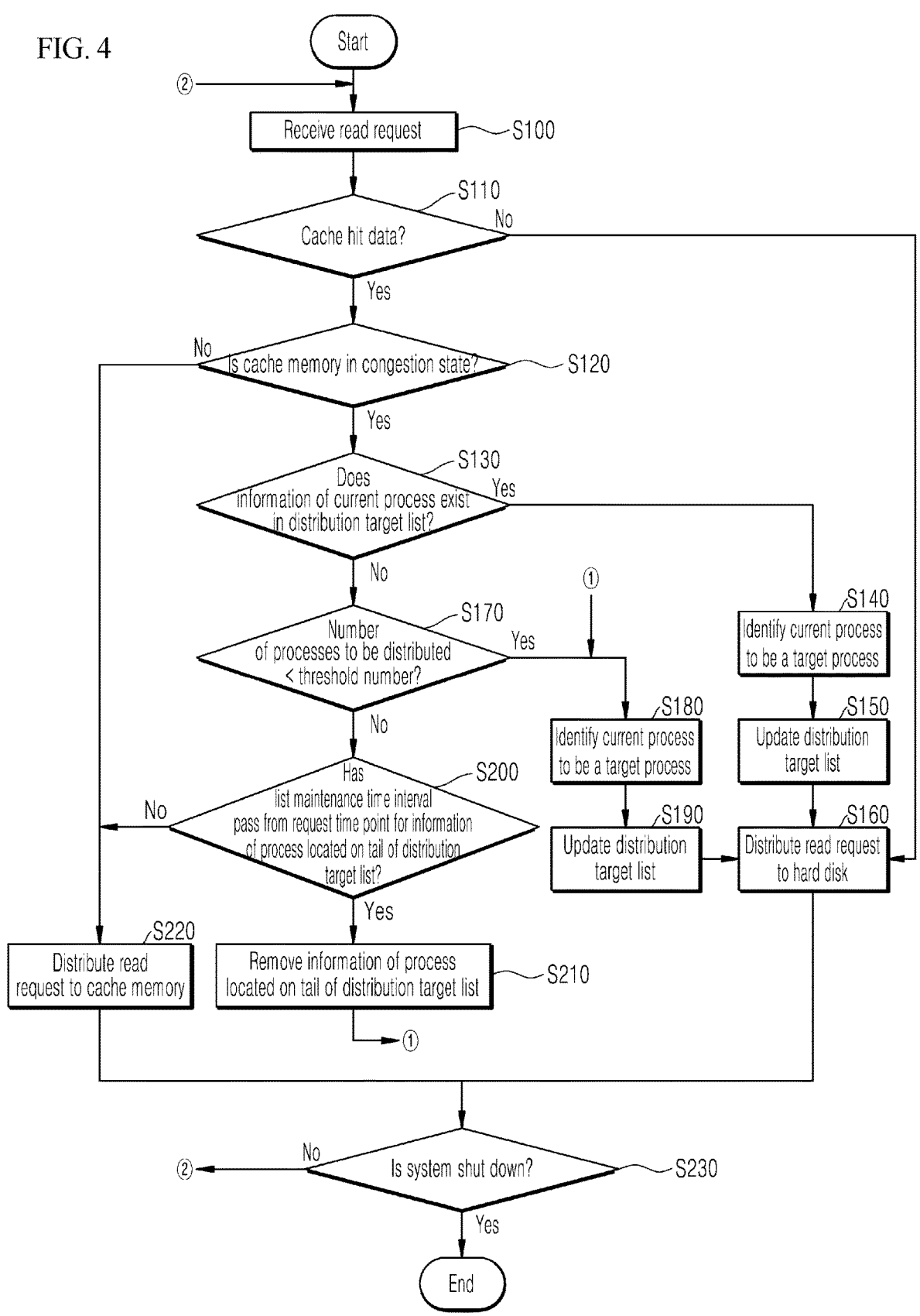
FIG. 4 is an operation flow diagram showing an operation method of a memory control device according to an embodiment of the present disclosure.

Hereinafter, an operation method of a memory control device according to an embodiment of the present disclosure will be described with reference to FIG. 4. For the convenience of the description, the reference numerals of FIGS. 1 to 3 will be used.

In an operation method of the memory control device 100, when a read request generated in the file system 200, specifically, in a process within the file system 200 is received by (distributed to) the memory control device 100 of the present disclosure located in a block layer of an operating system (S100), it is determined whether the current read request is a read request for cache hit data (S110).

In the operation method of the memory control device 100, when it is identified that the current read request is not a read request for cache hit data (S110 No), the current read request may be distributed to the hard disk 20 (S160), to allow the hard disk 20 to process the read request.

In the operation method of the memory control device 100, when the current read request is identified to be a read request for cache hit data (S110 Yes), a distribution function is activated according to a state of the cache memory 10 (S120).

More specifically, in the operation method of the memory control device 100, an average processing time interval of a request (e.g. read/write request) processed in the cache memory 10 during a unit time interval (e.g. one second) is monitored; when the average processing time interval is equal to or greater than a threshold time interval (await threshold value), it is determined that a state (throughput) of the cache memory 10 is in a state where a bandwidth of the cache memory 10 is close to a maximum bandwidth, that is, in a congestion state; and a distribution function is activated (S120 Yes).

Meanwhile, in the operation method of the memory control device 100, when an average processing time interval monitored in a unit time interval (e.g. one second) is not greater than a threshold time interval (await threshold value), a state (throughput) of the cache memory 10 is determined not to be in a congestion state, and then a distribution function is deactivated (S120 No).

Then, in the operation method of the memory control device 100, the current read request may be distributed to the cache memory 10 (S220), to allow the cache memory 10 to process the read request in a state where the distribution function is deactivated (S120 No).

Meanwhile, in the operation method of the memory control device 100, it is determined whether a process having generated the current read request corresponds to the target process to be distributed in a state where the distribution function is activated (S120 Yes).

Hereinafter, a procedure of determining whether a process having generated the current read request corresponds to the target process will be described in detail.

First of all, in the operation method of the memory control device 100, it is determined whether information of a process having generated the current read request exists in a distribution target list 130 (S130).

In the operation method of the memory control device 100, when information of a process having generated the current read request exists in a distribution target list 130 (S130 Yes), it may be identified that the process corresponds to the target process (S140).

For example, in the operation method of the memory control device 100, on an assumption that a process having generated the current read request is process 3, it may be identified that process 3 is the target process when information of process 3 having generated the current read request exists in the distribution target list 130.

Then, the distribution target list 130 may be updated reflecting a result of the identification in operation S140, that is, a result obtained by identifying that the process 3 existing in the distribution target list 130 corresponds to the target process (S150).

More specifically, the distribution target list 130 may be updated such that: the information of process 3 having existed in the distribution target list 130 is removed; pieces of information of respective processes located from a head of the distribution target list 130 to immediately before the removed information of process 3, that is, pieces of information of processes 1 and 5 move (move to the next one by one); and then information of process 3 including a request time point of the current read request is located on the head (S150).

Then, in the operation method of the memory control device 100, the current read request is distributed to the hard disk 20 (S160) to allow the hard disk 20 to process the read request.

Meanwhile, in the operation method of the memory control device 100, when information of the process having generated the current read request does not exist in the distribution target list 130 (S130 No), it is determined whether the number of processes configured as the target process is smaller than a predefined threshold number (N) (S170).

For example, in the operation method of the memory control device 100, on an assumption that a process having generated the current read request is process 11, it is determined whether the number of processes configured as the target process up to the current time point is smaller than the threshold number (N) when it is identified that information of process 11 having generated the current read request does not exist in the distribution target list 130.

Then, in the operation method of the memory control device 100, when the number of processes configured as the target process up to the current time point is smaller than the threshold number (N) (S170 Yes), process 11 may be identified to be the target process (S180).

When the number of processes configured as the target process up to the current time point is smaller than the threshold number (N), the number of pieces of information of processes listed in the distribution target list 130 is smaller than N. Therefore, at least a tail part in the distribution target list 130 may be empty.

Then, the distribution target list 130 may be updated reflecting a result of the identification in operation S180, that is, a result of identifying that process 11 not existing in the distribution target list 130 corresponds to the target process (S190).

More specifically, the distribution target list 130 may be updated such that: pieces of information of respective processes located from a head of the distribution target list 130, that is, pieces of information of processes 1, 5 and 3 move (move to the next one by one); and then information of process 11 including a request time point of the current read request is located on the head (S190).

In the operation method of the memory control device 100, the current read request is distributed to the hard disk 20 (S160) to allow the hard disk 20 to process the read request.

Meanwhile, in the operation method of the memory control device 100, when the number of processes configured as the target process in operation S170 is not smaller than the threshold number (N) (S170 No), it is determined whether information of a process located on the tail of the distribution target list 130 can be removed.

When the number of processes configured as target process up to the current time point is not smaller than the threshold number (N), the distribution target list 130 may be in a full state where the number of pieces of information of the listed processes is N and the list is fully filled up to the tail thereof.

Then, it is determined whether information of a process located on the tail can be removed from in the distribution target list 130. When a predefined list maintenance time interval has passed from a request time point 7 included in information of process 7 located on the tail in the distribution target list 130 (S200 Yes), the information of process 7 located on the tail may be determined to be able to be removed (S210).

Therefore, information of a process having generated a read request before the list maintenance time interval can be removed from the distribution target list 130, and another new process can be configured to be the target process.

When a list maintenance time interval has passed from the request time point 7 included in information of process 7, the information of process 7 may be removed from the tail of the distribution target list 130.

Then, in the operation method of the memory control device 100, when the information of a process located on the tail of the distribution target list 130 is removed (S210 ①), process 11 may be identified to be the target process (S180).

Then, the distribution target list 130 may be updated reflecting a result of the identification in operation S180, that is, a result of identifying that process 11 not existing in the distribution target list 130 corresponds to the target process (S190).

More specifically, the distribution target list 130 may be updated such that: pieces of information of respective processes located from a head of the distribution target list 130, that is, pieces of information of processes 1, 5 and 3 move (move to the next one by one), and then information of process 11 including a request time point of the current read request is located on the head (S190).

Then, in the operation method of the memory control device 100, the current read request is distributed to the hard disk 20 (S160), to allow the hard disk 20 to process the read request.

In the operation method of the memory control device 100, unless the system is not shut down (S230 No), the aforementioned operations after operation S100 (②) are performed at every time when a read request is received (distributed), to distribute the read request to the cache memory 10 and the hard disk 20.

Unlike an existing method of unconditionally distributing a read request for cache hit data to a cache memory 10, in an operation method of a memory control device according to an embodiment of the present disclosure, the read request can be distributed to a hard disk 20 as well as the cache memory 10 to process the read request, thereby maximizing the throughput of the entire storage device, as described above.

The operation method of the memory control device according to an embodiment of the present disclosure may be implemented in the form of program commands executable through various computer means and recorded in a computer readable medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and the technical idea of the present disclosure covers a range in which anyone who has common knowledge in the technical field to which the present disclosure belongs can make various modifications and changes without departing from the substance of the present disclosure claimed by claims below.

What is claimed is:

1. A memory control device comprising a processor, wherein said processor comprises:
    an activation control unit configured to activate a distribution function according to a state of a cache memory when a read request for cache hit data is identified;
    a distribution target identification unit configured to determine whether a process generating the read request corresponds to a target process to be distributed when the distribution function is activated; and
    a read request distribution unit configured to distribute the read request to a hard disk to allow the hard disk to process the read request instead of the cache memory when the process is identified to be the target process.

2. The memory control device of claim 1, wherein the activation control unit is configured to:
    monitor an average processing time interval for a request processed in the cache memory during a unit time interval; and
    activate the distribution function when the average processing time interval is equal to or greater than a predefined threshold time interval.

3. The memory control device of claim 2, wherein the threshold time interval is equal to or longer than a minimum processing time interval measured when a bandwidth according to throughput for request processed during a unit time interval in the cache memory is close to a predetermined maximum bandwidth.

4. The memory control device of claim 3, wherein the activation control unit is configured to deactivate the distribution function after the distribution function is activated, when a bandwidth of the cache memory becomes smaller by a predetermined size or more than the maximum bandwidth or when a total bandwidth of the hard disk and the cache memory is smaller than a total bandwidth before the distribution function is activated.

5. The memory control device of claim 2, wherein the activation control unit is configured to differently define a threshold number of processes that can be configured to be the target process, according to a degree by which the average processing time interval exceeds the threshold time interval in the case of activating the distribution function.

6. The memory control device of claim 1, wherein the distribution target identification unit is configured to determine whether the process corresponds to the target process, on the basis of a distribution target list in which pieces of information of respective processes configured as the target process are included.

7. The memory control device of claim 6, wherein
    the pieces of information of the respective processes included in the distribution target list comprise a process identifier and a request time point of a last read request generated in the process, and
    the distribution target list includes pieces of information of a predefined threshold number of processes where information of a process including an oldest request time point is located on a tail, and is updated reflecting an identification result of the distribution target identification unit.

8. The memory control device of claim 7, wherein
    the distribution target identification unit is configured to, identify the process as the target process when information of the process is included in the distribution target list, and
    the distribution target list is updated such that:
        the information of the process included in the distribution target list is removed;
        pieces of information of processes located from a head of the distribution target list to a prior location to the removed information of the process is moved; and
        then information of the process including a request time point of the read request is located on the head.

9. The memory control device of claim 7, wherein
    the distribution target identification unit is configured to, identify the process as the target process when information of the process is not included in the distribution target list and the number of processes configured as the target process is smaller than the threshold number, and
    the distribution target list is updated such that:
        pieces of information of respective processes located from a head of the distribution target list is moved; and
        then information of the process including a request time point of the read request is located on the head.

10. The memory control device of claim 7, wherein the distribution target identification unit is configured to:
    determine whether information of a process located on the tail of the distribution target list can be removed, when information of the process is not included in the distribution target list and the number of processes configured as the target process is not smaller than the threshold number; and
    identify the process as the target process when the information of the tail is removed.

11. The memory control device of claim 10, wherein the distribution target list is updated such that:
    the information of the process located on the tail of the distribution target list is removed when a predefined list maintenance time interval passes from a request time point included in the information of the process located on the tail;
    pieces of information of respective processes located from the head of the distribution target list is moved; and
    then information of the process including a request time point of the read request is located on the head.

12. An operation method of a memory control device, the operation method comprising:
    performing an activation control by activating a distribution function according to a state of a cache memory when a read request for cache hit data is identified;
    performing a distribution target identification by determining whether a process generating the read request corresponds to a target process to be distributed when the distribution function is activated; and performing a read request distribution by distributing the read request to a hard disk to allow the hard disk to process the read request instead of the cache memory when the process is identified to be the target process.

13. The operation method of claim 12, wherein performing the distribution target identification comprises:

determining whether the process corresponds to the target process, on the basis of a distribution target list in which pieces of information of respective processes configured as the target process are included.

14. The operation method of claim 13, wherein the pieces of information of the processes listed in the distribution target list comprise:

a process identifier and a request time point of a last read request generated in the process, and the distribution target list includes pieces of information of a predefined threshold number of pieces of information of processes where information of a process including an oldest request time point is located on a tail, and is updated reflecting an identification result.

15. The operation method of claim 14, wherein performing the distribution target identification comprises:

identifying the process to be the target process in a case where information of the process is not included in the distribution target list when the number of processes configured as the target process is smaller than the threshold number, and identifying the process to the target process in a case where information of the process is not included in the distribution target list and the number of processes configured as the target process is not smaller than the threshold number when determining whether information of a process located on the tail of the distribution target list can be removed and removing the information of the tail.

16. The operation method of claim 13, wherein performing the distribution target identification comprises:

identifying the process to be the target process when information of the process is included in the distribution target list.

* * * * *